(12) United States Patent
Mauchly

(10) Patent No.: US 8,164,617 B2
(45) Date of Patent: Apr. 24, 2012

(54) COMBINING VIEWS OF A PLURALITY OF CAMERAS FOR A VIDEO CONFERENCING ENDPOINT WITH A DISPLAY WALL

(75) Inventor: J. William Mauchly, Berwyn, PA (US)

(73) Assignee: Cisco Technology, Inc., San Jose, CA (US)

( * ) Notice: Subject to any disclaimer, the term of this patent is extended or adjusted under 35 U.S.C. 154(b) by 612 days.

(21) Appl. No.: 12/411,300

(22) Filed: Mar. 25, 2009

(65) Prior Publication Data

US 2010/0245535 A1    Sep. 30, 2010

(51) Int. Cl.
*H04N 7/14* (2006.01)

(52) U.S. Cl. ............ 348/14.08; 348/14.01; 348/14.12; 348/14.16

(58) Field of Classification Search .... 348/14.01–14.16, 348/36, 48; 382/275, 276
See application file for complete search history.

(56) References Cited

U.S. PATENT DOCUMENTS

| | | | | |
|---|---|---|---|---|
| 6,710,797 | B1 | 3/2004 | McNelley et al. | 348/14.16 |
| 7,209,160 | B2 | 4/2007 | McNelley et al. | 348/14.16 |
| 7,576,766 | B2 * | 8/2009 | Cutler | 348/14.08 |
| 2002/0061131 | A1 | 5/2002 | Sawhney et al. | 382/154 |
| 2002/0122113 | A1 | 9/2002 | Foote | 348/48 |
| 2004/0061787 | A1 | 4/2004 | Liu et al. | 348/218.1 |
| 2004/0207831 | A1 | 10/2004 | Aoyama | 356/3 |
| 2004/0239699 | A1 | 12/2004 | Uyttendaele et al. | 345/716 |
| 2004/0263611 | A1 * | 12/2004 | Cutler | 348/36 |
| 2005/0078865 | A1 | 4/2005 | Criminisi et al. | 382/154 |
| 2005/0078866 | A1 | 4/2005 | Criminisi et al. | 382/154 |
| 2005/0129325 | A1 | 6/2005 | Wu | 382/254 |
| 2005/0232509 | A1 | 10/2005 | Blake et al. | 382/275 |
| 2005/0232510 | A1 | 10/2005 | Blake et al. | 382/275 |
| 2005/0283730 | A1 | 12/2005 | Uyttendaele et al. | 715/720 |
| 2005/0285874 | A1 | 12/2005 | Zitnick et al. | 345/592 |
| 2005/0285875 | A1 | 12/2005 | Kang et al. | 345/629 |
| 2005/0286757 | A1 | 12/2005 | Zitnick et al. | 382/154 |
| 2005/0286758 | A1 | 12/2005 | Zitnick et al. | 382/154 |
| 2005/0286759 | A1 | 12/2005 | Zitnick et al. | 382/154 |
| 2006/0028473 | A1 | 2/2006 | Uyttendaele et al. | 345/473 |
| 2006/0028489 | A1 | 2/2006 | Uyttendaele et al. | 345/646 |
| 2006/0029134 | A1 | 2/2006 | Winder et al. | 375/240.12 |

(Continued)

FOREIGN PATENT DOCUMENTS

EP    1 612 732 A2    6/2005

(Continued)

OTHER PUBLICATIONS

International Search Report on PCT Application PCT/US2010/028328 mailed Jun. 18, 2010.

(Continued)

*Primary Examiner* — Melur Ramakrishnaiah
(74) *Attorney, Agent, or Firm* — Dov Rosenfeld; Inventek

(57) ABSTRACT

A telepresence apparatus, a method of operating a telepresence apparatus, and a tangible computer readable storage medium in a telepresence apparatus that is configured with instructions that when executed cause operating of the telepresence apparatus. The telepresence apparatus includes video cameras districted co-planar with a display wall and capturing camera views of a scene. The camera views from the video processor combined to form a video signal for transmission to one or more remote endpoints, the video signal corresponding to a synthetic view from a point that is substantially behind the wall and as if the wall was not there.

25 Claims, 12 Drawing Sheets

U.S. PATENT DOCUMENTS

| | | | |
|---|---|---|---|
| 2006/0031915 A1 | 2/2006 | Winder et al. | 725/135 |
| 2006/0031917 A1 | 2/2006 | Winder et al. | 725/135 |
| 2006/0114253 A1 | 6/2006 | Zitnick et al. | 345/422 |
| 2006/0125920 A1 | 6/2006 | Criminisi et al. | 348/159 |
| 2006/0193509 A1 | 8/2006 | Criminisi et al. | 382/154 |
| 2006/0285747 A1 | 12/2006 | Blake et al. | 382/180 |
| 2007/0031037 A1 | 2/2007 | Blake et al. | 382/173 |
| 2007/0058879 A1 | 3/2007 | Cutler et al. | 382/254 |
| 2007/0206878 A1* | 9/2007 | Liu et al. | 382/276 |
| 2008/0184124 A1 | 7/2008 | Agarwal et al. | 715/733 |

FOREIGN PATENT DOCUMENTS

| | | |
|---|---|---|
| EP | 1 589 758 A1 | 10/2005 |
| EP | 1 592 198 A1 | 11/2005 |
| WO | WO0239716 | 5/2002 |

OTHER PUBLICATIONS

Zicheng Liu et al: "Head-Size Equalization for Improved Visual Perception in Video Conferencing" IEEE Transactions on Multimedia, IEEE Service Center, Piscataway, NJ, US LNKD-DOI:10.1109/TMM.2007.906571, vol. 9, No. 7, Nov. 1, 2007.

P. Rander, "A Multi-Camera Method for 3D Digitization of Dynamic, Real-World Events." The Robotics Institute. May 1998. Carnegie Mellon. Retrieved Feb. 23, 2009 <http://www.ri.cmu.edu/publication_view.html?pub_id=480>.

A. Agarwala, M. Agrawala, M. Cohen, D. Salesin, and R. Szeliski. "Photographing long scenes with multi-viewpoint panoramas." ACM Transactions on Graphics (Proceedings of SIGGRAPH 2006). 2006. University of Washington. Retrieved Feb. 23, 2009 <http://grail.cs.washington.edu/projects/multipano/agarwala_sig06.pdf>.

Y.Y. Chuang, B. Curless, D.H. Salesin, and R. Szeliski. "A Bayesian Approach to Digital Matting." Proceedings of IEEE Computer Vision and Pattern Recognition (CVPR 2001), Dec. 2001, vol. II, pp. 264-271.

N. Cornelis and L. Van Gool. "Real-Time Connectivity Constrained Depth Map Computation Using Programmable Graphics Hardware." *Proceedings of the 2005 IEEE Computer Society Conference on Computer Vision and Pattern Recognition (CVPR 2005)*, Jun. 2005, vol. I, pp. 1099-1104.

A. Criminisi, J. Shotton, A. Blake, C. Rother, and P.H.S. Torr. "Efficient dense stereo with occlusions for new view-synthesis by four-state dynamic programming." *International Journal of Computer Vision*, Jan. 2007. Retrieved Feb. 23, 2009 <http://jamie.shotton.org/work/publications/ijcv07b.pdf>.

A. Criminisi; J. Shotton, A. Blake, P.H.S. Torr. "Gaze manipulation for one-to-one teleconferencing." *Proceedings of the Ninth IEEE International Conference on Computer Vision (ICCV 2003)*, Oct. 2003, vol. 1, pp. 191-198.

"France Telecom's Magic Telepresence Wall," Jul. 11, 2006. The Human Productivity Lab. Retrieved Apr. 22, 2008 <http://www.humanproductivitylab.com/archive_blogs/2006/07/11/france_telecoms_magic_telepres_1.php>.

"The telepresence wall which eradicates frontiers and distance." Jul. 1, 2002. France Telecom. Retrieved Feb. 23, 2009 <http://www.francetelecom.com/sirius/rd/en/galerie/mur_telepresence/pdf/doc.pdf>.

H. Hile and C. Zheng. "Stereo Video Processing for Depth Map." Retrieved Mar. 7, 2009 <http://www.colinzheng.org/wp-content/data/courses/Colin567Stereo.pdf>.

S.B. Kang, and R. Szeliski. "Extracting View-Dependent Depth Maps from a Collection of Images." *International Journal of Computer Vision*, Jul. 2004, vol. 58, pp. 139-163.

H.Y. Shum, and S.B. Kang. "A Review of Image-based Rendering Techniques." Microsoft Research. Retrieved Feb. 23, 2009 <http://research.microsoft.com/pubs/68826/review_image_rendering.pdf>.

H.S. Lichtman. "Telepresence, Effective Visual Collaboration and the Future of Global Business at the Speed of Light." Aug. 2006. Human Productivity Lab. Retrieved Apr. 22, 2008 <http://www.humanproductivitylab.com/telepresencepaper/hpl_telepresence_paper.pdf>.

I. Geys, T.P. Koninckx, and L. Van Gool. "Fast interpolated cameras by combining a GPU based plane sweep with a max-flow regularisation algorithm." *Proceedings of the 2nd International Symposium on 3D Data Processing, Visualization and Transmission (3DPVT 2004)*, Sep. 2004, pp. 534-541.

D. Gallup, J.M. Frahm, P. Mordohai, Q. Yang, and M. Pollefeys. "Real-Time Plane-Sweeping Stereo with Multiple Sweeping Directions." *IEEE Conference on Computer Vision and Pattern Recognition (CVPR)*, Jun. 2007, pp. 1-8.

"Introduction." Blue-c-II. Jun. 18, 2007. Swiss Institute of Technology (ETH) Zürich. Retrieved Feb. 23, 2009 <http://blue-c-ii.ethz.ch/>.

"Technology." Blue-c-II. Jun. 18, 2007. Swiss Institute of Technology (ETH) Zürich. Retrieved Feb. 23, 2009 <http://blue-c-ii.ethz.ch/?Technology>.

"View-independent Video." Blue-c-II. Jun. 18, 2007. Swiss Institute of Technology (ETH) Zürich. Retrieved Feb. 23, 2009 <http://blue-c-ii.ethz.ch/?Technology:View-independent_Video>.

E. Cooke, I. Feldmann, P. Kauff, O. Schreer, "A Modular Approach to Virtual View Creation for a Scalable Immersive Teleconferencing Configuration", *Proceedings of International Conference on Image Processing (ICIP 2003)*, Sep. 2003, vol. 3, pp. 41-44.

"DVE Telepresence Array Room." DVE Telepresence Products. 2006. Digital Video Enterprises, Inc. Irvine, California. Retrieved Feb. 23, 2009 at <http://www.dvetelepresence.com/products/array_room.asp>.

"Depth map creator." 3D Photo Productions. 2004. Retrieved Mar. 7, 2009 at <http://www.3dphotopro.com/soft/depthmap/help.htm>.

P. Merrell, A. Akbarzadeh, L. Wang, P. Mordohai, J.M. Frahm, R. Yang, D. Nister, and M. Pollefeys. "Real-Time Visibility-based Fusion of Depth Maps." *IEEE 11th International Conference on Computer Vision (ICCV 2007)*. Oct. 2007.

A. Saxena, M. Sun, A.Y. Ng, "Make3D: Depth Perception from a Single Still Image." *Proceedings of the Twenty-Third AAAI Conference on Artificial Intelligence*. 2008. Retrieved Mar. 7, 2009 <https://www.aaai.org/Papers/AAAI/2008/AAAI08-265.pdf>.

S.M. Seitz, B. Curless, J. Diebel, D. Scharstein, R. Szeliski, "A Comparison and Evaluation of Multi-View Stereo Reconstruction Algorithms." *2006 IEEE Computer Society Conference on Computer Vision and Pattern Recognition (CVPR 2006)*. Jun. 2006, vol. 1, pp. 519-526.

R.E. Silva. "Generation of Orthogonal Projections from Sparse Camera Arrays." Thesis. Virginia Polytechnic Institute and State University. May 17, 2007. Computer Science Department. Retrieved Apr. 21, 2008 <http://scholar.lib.vt.edu/theses/available/etd-05182007-124239/unrestricted/thesis.pdf>.

R. Szeliski. "Image Alignment and Stitching: A Tutorial." *Foundations and Trends in Computer Graphics and Vision*. Dec. 2006, vol. 2, No. 1, pp. 1-104.

S. McNelley and J.Machtig. "What is Telepresence." Digital Video Enterprises, Inc. Irvine, California. Retrieved Feb. 23, 2009 at <www.dvetelepresence.com/files/whatIsTelepresence.pdf>.

R. Yang and M. Pollefeys. "Multi-Resolution Real-Time Stereo on Commodity Graphics Hardware." *Proceedings of the 2003 IEEE Computer Society Conference on Computer Vision and Pattern Recognition (CVPR '03)*. Jun. 2003, vol. 1, pp. I-211-I-217.

C. Zach, M. Sormann, and K. Karner, "High-Performance Multi-View Reconstruction." *Third International Symposium on 3D Data Processing, Visualization, and Transmission*, Jun. 2006, pp. 113-120.

C. Zach, T. Pock, and H. Bischof, "A Globally Optimal Algorithm for Robust TV-L$^1$ Range Image Integration." *IEEE 11th International Conference on Computer Vision*. Oct. 2007, pp. 1-8.

Z. Zhang. "A Flexible New Technique for Camera Calibration." *IEEE Transactions on Pattern Analysis and Machine Intelligence*. Nov. 2000, vol. 22, No. 11, pp. 1330-1334.

C.L. Zitnick, S.B. Kang, M. Uyttendaele, S. Winder, and R. Szeliski. "High-Quality Video View Interpolation Using a Layered Representation." *ACM Transactions on Graphics*. Aug. 2004, vol. 23, No. 3., pp. 600-608.

* cited by examiner

COMBINING VIEWS OF A PLURALITY OF CAMERAS FOR A VIDEO CONFERENCING ENDPOINT WITH A DISPLAY WALL

FIELD OF THE INVENTION

The present disclosure relates generally to video conferencing.

BACKGROUND

Very large displays, e.g., display walls as large as eight feet high and forty feet wide or even larger are possible either with rear projection displays or with a planar array of multiple flat screen displays. Video conferencing with life-size images, e.g., using HDTV resolution display devices has recently been introduced, and is often called "telepresence." A video-conferencing terminal having a very large, e.g., wall-size display would extend the telepresence experience. When the various participants are at a range of distances from the display wall, basic problems arise. For example, it is not at all clear where camera or cameras can be placed, and how each camera's video could be processed, to produce a meaningful illusion of presence. Ideally, a single camera should be placed behind the display and significant distance therefrom in order to provide a view with participants having correct eye contact when looking at the screen, and without the distortion accompanying an extreme wide angle camera.

DESCRIPTION OF EXAMPLE EMBODIMENTS

Overview

Figure 1:
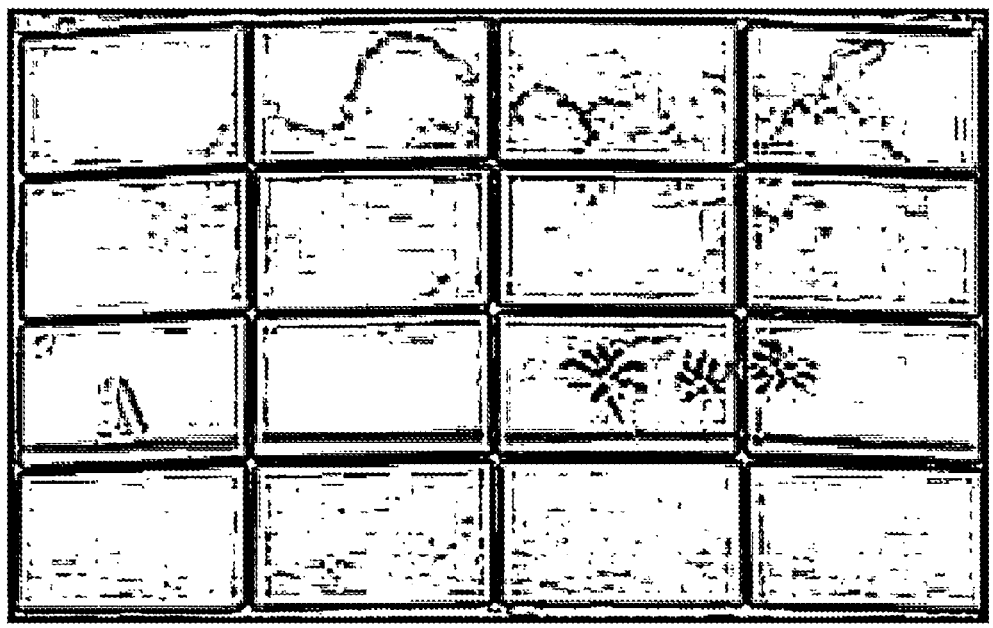
FIG. 1 shows an example of a set of display monitors forming a telepresence display wall along a plane. The display wall of FIG. 1 is usable in embodiments of the present invention.

Embodiments of the present invention include a telepresence apparatus, a method of operating a telepresence apparatus, and a tangible computer readable storage medium in a telepresence apparatus that is configured with instructions that when executed cause operating of the telepresence apparatus. The telepresence apparatus includes video cameras distributed along substantially co-planar with a display wall and capturing camera views of a scene. The camera views from the video processor are processed to form a video signal for transmission to one or more remote endpoints, the video signal corresponding to a synthetic view from a point that is substantially behind the wall and as if the wall was not there.

Particular embodiments include a telepresence apparatus including a display wall and a plurality of synchronized video cameras substantially co-planar with the display wall. Each camera provides a camera view of a scene, and the camera views overlap to cover the scene. The apparatus further comprises an interface configured to accept camera views of the scene from the video cameras. The apparatus further comprises a camera view processor system coupled to the interface and configured to process the accepted camera views to generate a synthetic particular view from a particular point on the opposite side of the display wall than the scene and at a substantial distance therefrom. The camera view processor system includes an integrated depth map creator module configured to create an integrated depth map of the scene. In one version, the integrated disparity map creator includes a disparity creator module configured to create disparity maps between individual cameras by operating on sets of views of pairs of cameras, and an integrator module configured to create an integrated depth map of the scene. The camera view processor system further includes a view synthesizer module coupled to and configured to accept the camera scenes from the interface and configured to combine the camera views in a particular manner according to the integrated depth map. The combining the camera views includes warping of particular camera views, to the synthetic particular view at a viewpoint, such that, for two objects or participants that are in at least one camera view, the difference in size of the two objects or participants due to difference in their respective distance from the display wall is less in the synthetic particular view than in any single camera view in which the two objects or participants are present. The view synthesizer module thus is configured scale the sizes of objects or participants to maintain perspective and the relationship of object sizes according to their respective distances to the display wall. The apparatus further comprises a video forming module configured to form video from synthetic views at different successive frame times, the formed video for transmission to one or more remote endpoints.

Particular embodiments include a method of operating a videoconference apparatus. The method comprises accepting camera signals from a plurality of time synchronized cameras aimed at a scene, and processing the camera signals to create video signals representing a particular view of the scene as viewed from particular point at a particular distance from the scene. In some embodiments, the method further includes compressing the created video signals to form a compressed video for transmission to one or more remote endpoints; and transmitting the compressed video to the one or more remote endpoints. The cameras are distributed substantially co-planar with and along a substantially planar display wall that is made up of one or more flat screen displays or one or more projections displays. The particular distance of the particular point is at least the width of the display wall. Processing the camera signals includes scaling of parts of the scene to create the signal of the particular view, wherein objects in camera signals from a particular camera that are further away from the particular camera are enlarged relative to objects in camera signals from another camera that are close to the other camera, such that for two objects or participants that are in at least one camera view, the difference in size of the two objects or participants due to difference in their respective distance from the display wall is less in the particular view than in any single camera view in which the two objects or participants are present.

Particular embodiments include a tangible computer readable storage medium in a telepresence apparatus, the tangible computer readable storage medium including instructions that when executed by one or more processors in the telepresence apparatus, are configured to operate the telepresence apparatus. The storage medium includes one or more portions storing code, including code in a portion that when executed causes accepting camera signals from a plurality of time synchronized cameras aimed at a scene. The storage medium further includes one or more portions storing code that when executed causes processing the camera signals to create video signals representing a particular view of the scene as viewed from particular point at a particular distance from the scene. The storage medium further includes one or more portions storing code that when executed causes compressing the created video signals to form s compressed video for transmission to one or more remote endpoints. The cameras are distributed substantially co-planar with and along a substantially planar display wall that is made up of one or more flat screen displays or one or projections displays. The particular distance of the particular point is at least the width of the display wall. Processing the camera signals includes scaling of parts of the scene to create the signal of the particular view, wherein objects in camera signals from a particular camera that are further away from the particular camera are enlarged relative to objects in camera signals from another camera that are close to the other camera, such that for two objects or participants that are in at least one camera view, the difference in size of the two objects or participants due to difference in their respective distance from the display wall is less in the particular view than in any single camera view in which the two objects or participants are present.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

The Example Embodiments

By a telepresence display wall apparatus is meant a telepresence videoconference endpoint having a very large display, e.g., a very large projection display that is made of one or more projected images from one or more projectors, or a very large display made up of an array of monitors to form a very large substantially planar display (the display wall). The apparatus includes a plurality of cameras located approximately co-planer to the plane of the display wall and, the outputs of the video cameras are processed and combined to produce a video image for transmission to remote endpoints that typically would also be telepresence display wall apparatuses each having a display wall and a plurality of cameras.

FIG. 1 shows an example of a set of display monitors forming a telepresence display wall along a plane. In this example there are 4×4 so 16 monitors, and array of display monitors are not limited by the number of displays. By large is meant at least 8 feet wide, across and typically much larger, e.g., at least the width of a conference room or other meeting space. Note that large flat panel displays are now being developed, and embodiments of the invention can work with such large flat panel displays or a plurality thereof that form(s) the display wall.

Figure 2:
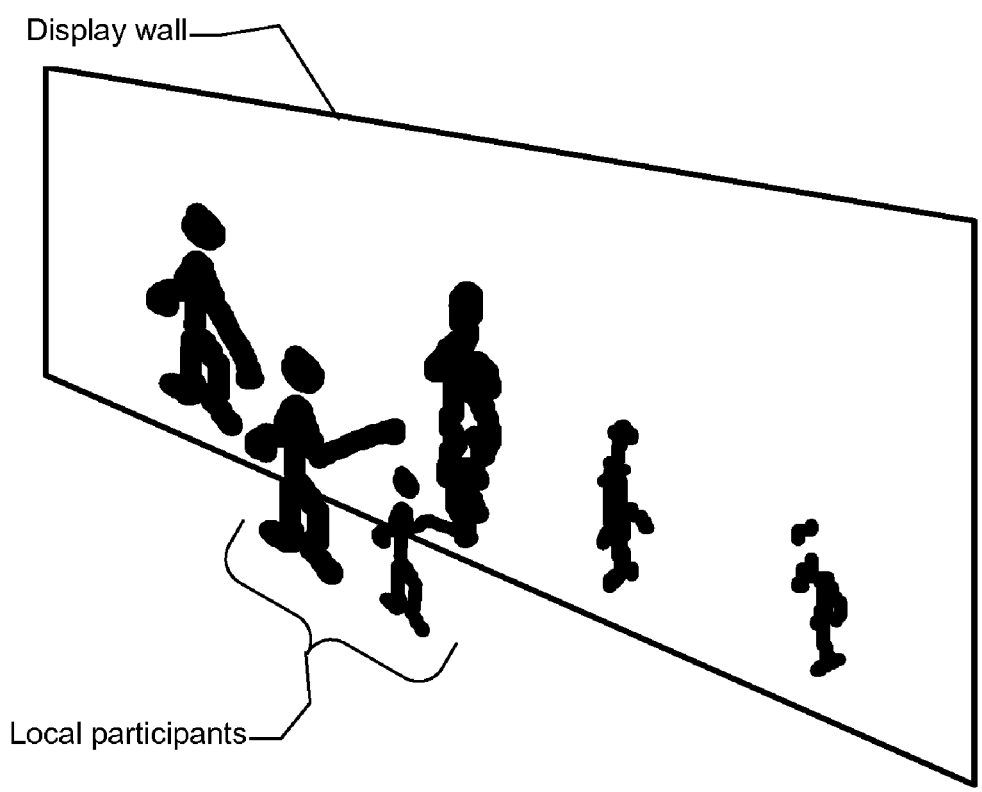
FIG. 2 shows a sketch of two participants in front of a telepresence display wall, formed for example by a rear projection system that uses one or an array of projected images, or by a set of display monitors such as in those FIG. 1.

FIG. 2 shows a sketch of two participants in front of a telepresence display wall, e.g., formed by a rear projection system that uses one or an array of projected images, or by a set of display monitors such as in those of FIG. 1. The telepresence display wall of FIG. 2 shows three remote participants.

A (Theoretical) Distant Rear Camera

Figure 3:
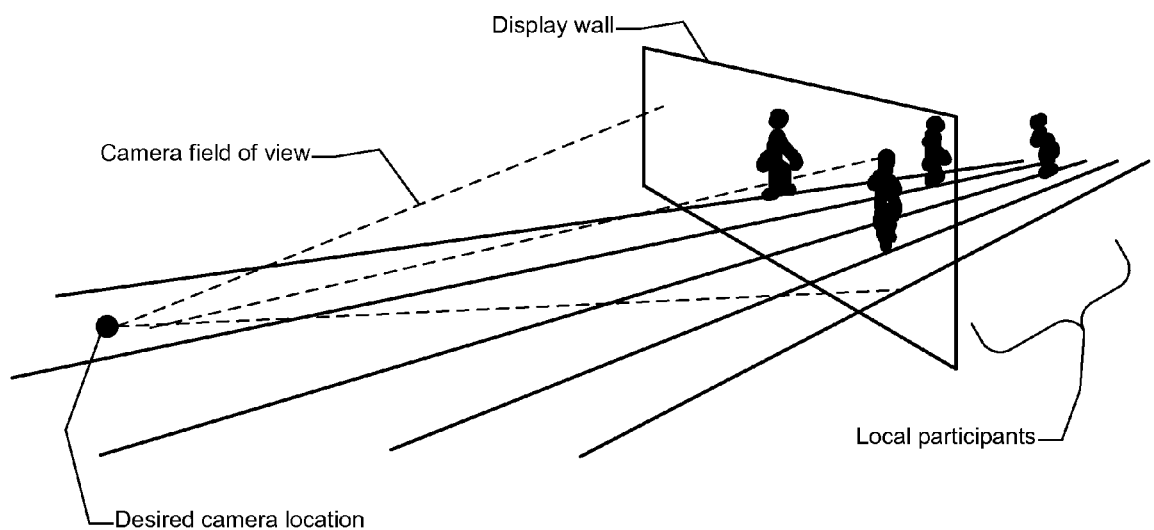
FIG. 3 shows a view from behind a telepresence display wall and shows a desired camera location behind and at a substantial distance from the display wall, with broken lines to indicate the camera's field of view. Embodiments of the present invention provide a synthetic view from the desired camera location.

It is desired to create, using one or more cameras, video for transmission to a remote endpoint which creates the illusion to a viewer at the remote endpoint of viewing the one or more local participants that are in front of the telepresence display wall, as if the remote viewer is viewing the local participants on a display wall from behind the local display wall. This provides the illusion of a physical space cut in half by the plane of the telepresence display wall, with the local participants on one side viewable by a remote participant, and all the remote participants viewable to a local participant on the other side. To achieve such an illusion for the remote viewer, a camera should be placed at considerable distance from the telepresence display wall. FIG. 3 shows a view from behind the telepresence display wall and shows a desired camera location behind the display wall, with broken lines to indicate the camera's field of view. Also shown are sketches of some local participants on viewing side of the telepresence display wall. Of course, in reality, the telepresence display wall is not transparent, and furthermore, there typically is not enough space behind the plurality of monitors or rear projection screen of the telepresence display wall for such a camera. While optical mechanisms are possible to make a rear projection display screen that is either semi-transparent or switchably transparent, such optical approaches and the associated electronics and mechanism(s) require space and are relatively complex and expensive.

Panoramic Camera Approach

Figure 4:
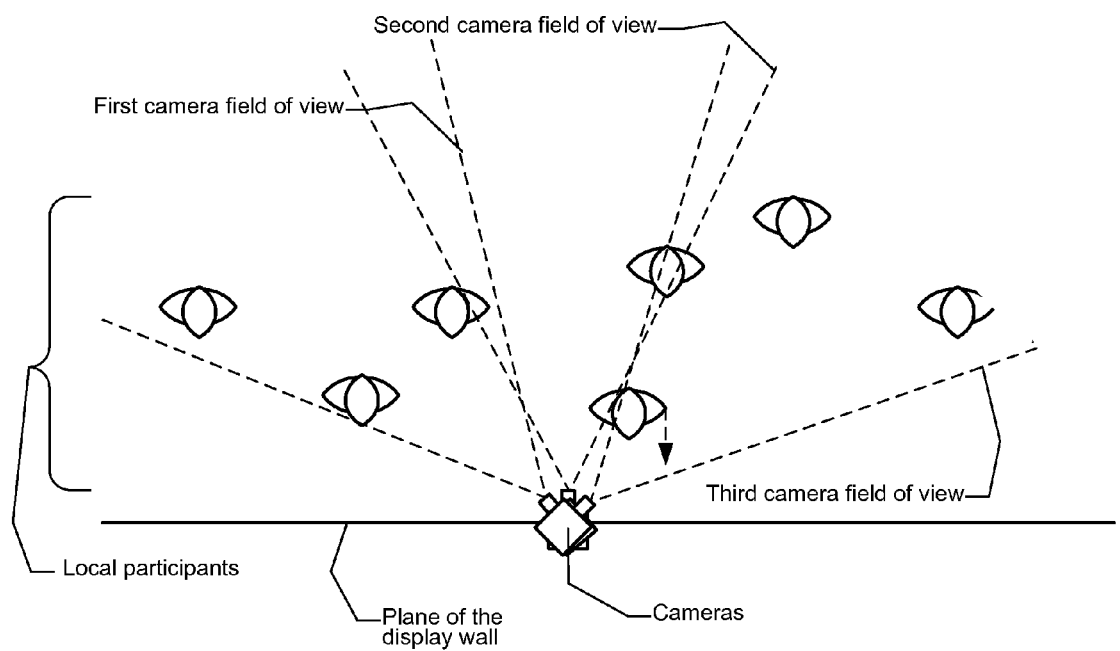
FIG. 4 illustrates one approach to obtaining a sufficient field of view to incorporate all participants of a view using a plurality of cameras located at approximately the same point at approximately the plane of the display wall.

FIG. 4 illustrates one approach to obtaining a sufficient field of view to incorporate all participants, and includes a plurality of cameras (three are shown) located at approximately the same point at approximately the plane of the display wall, each camera pointing in a different direction such that the fields of view of the cameras overlap. To use such an arrangement, the views from the different cameras are processed to stitch together to form a panorama view that incorporates all the local participants.

Such an arrangement might be satisfactory for a conference room in which the seating is constrained and where the participants are seated at approximately the same distance from the cameras.

Figure 5:
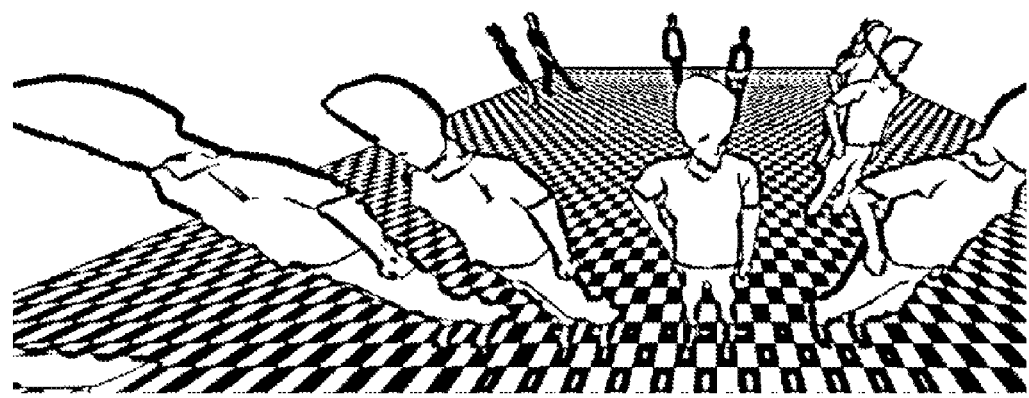
FIG. 5 shows a sketch of what a display image might look like for a remote display wall formed by stitching together a plurality of views from a set of cameras such as shown in FIG. 4.

However, when applied to a general room in which people may be at various distances to the display wall, and/or such that the people can arbitrarily move within a room, as shown in the simple example of FIG. 4, the panoramic camera method suffers from two disadvantages. FIG. 5 shows a sketch of what a display image might look like for a remote display wall formed by stitching together a plurality of views from a set of cameras. The sketch clearly illustrates by example two potential disadvantages. The first is severe perspective. Objects or people quickly become very large as they move closer to the camera, while people or objects that are relatively distant appear very small. The second potential disadvantage is poor eye contact. Except for a participant who is directly facing one of the cameras, e.g., a participant who is at the center of the camera view, people looking at the screen do not appear to be looking at the remote participant viewing the formed image, but rather appear to be looking to the side.

Embodiments Using Coplanar Cameras

Embodiments of the present invention include a telepresence apparatus that includes a camera or cameras that are mounted in the plane of a local telepresence display wall. The telepresence apparatus is configured to process the camera view(s) to generate an image for a remote telepresence display wall as if produced by a (virtual) distant rear camera. What complicates processing such images is that people that are far away from the local telepresence display wall are in more than one camera's view, while some people who are relatively close to the local telepresence display wall may not be seen in any camera view. Close objects can block a significant part of the background, including other objects and/or participants. Therefore, combining several different points-of-view from the plurality of cameras into a single picture that makes visual sense is a non-trivial task.

Figure 6A:
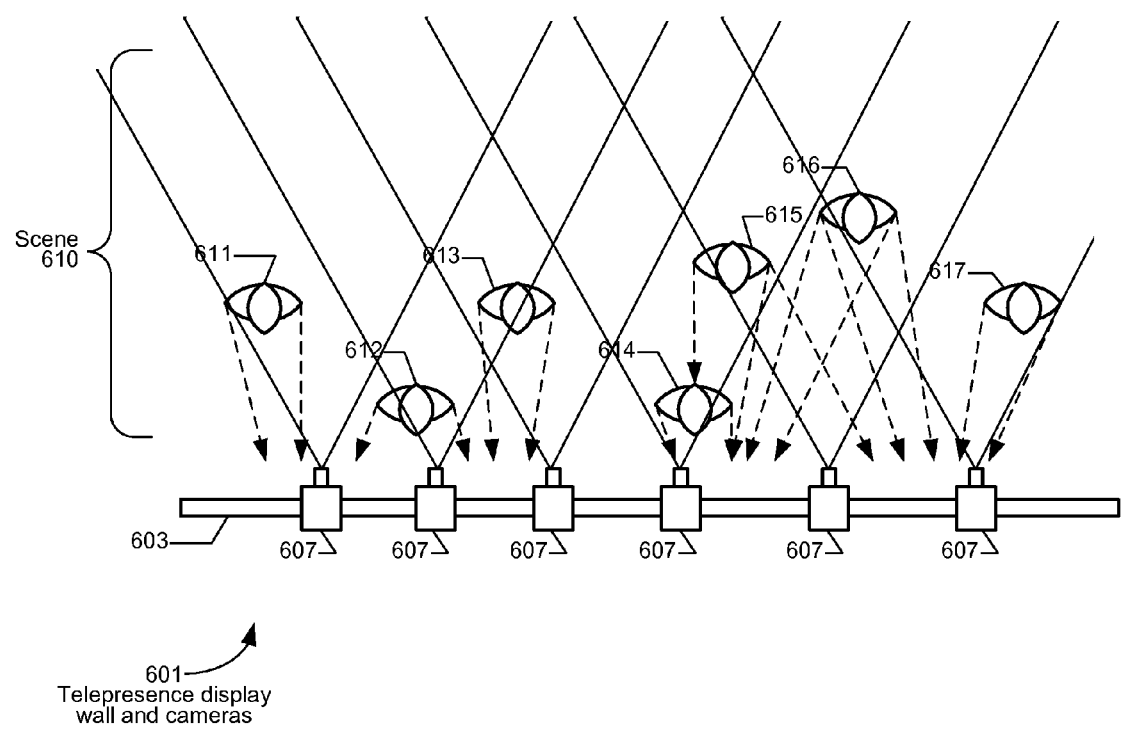
FIG. 6A shows a simplified block diagram of cameras having multiple overlapping fields of view of a scene, the cameras co-planar with the plane of a telepresence display wall.

FIGS. 6A, 6B, 6C, and 6D show one embodiment of a telepresence apparatus that includes a telepresence display wall 603 and camera arrangement that includes a plurality of cameras 607 substantially co-planar with, e.g., at the plane of a local telepresence display wall 603. FIG. 6A shows a simplified block diagram of apparatus 601 of the cameras 607 and display wall 603, and shows multiple overlapping fields of view of the cameras 607. The scene includes participants 611, 612, 613, 614, 615, 616, and 617 at different respective distances from the plane of the telepresence display wall 603.

The display wall 603 includes either an array of display devices or a projection screen onto which one or more images are projected.

In one embodiment of telepresence display wall and cameras apparatus 601, the plurality of cameras 607 are synchronized, e.g., frame-synchronized video cameras 607 and are arranged to be distributed substantially coplanar with the plane of a substantially planar local telepresence display wall 603, e.g., arranged as a one or two dimensional array along the plane of the display wall 603. All cameras point substantially in the same direction towards a scene 610 that in the drawing shown includes a plurality of local participants 611, 612, ..., 617.

What is desired is a way to produce an image consistent with a distant camera, but produced by the cameras that are mounted substantially in the plane of the display wall 603. FIG. 6A includes projections shown by dotted lines of how the different participants of the camera views from the cameras 607 would appear if the synchronized frames would simply be stitched, as in conventional image stitching methods. Such stitching is known, for example, for architectural rendering with a camera that moves linearly or equivalently with a sparse linear array of synchronized cameras in the case of video. As can be seen in FIG. 6A, participants may not be seen at all. Furthermore, close objects, e.g., participants appear larger and can block a large part of the background. With traditional stitching there is no obvious way to stitch several different points-of-view into a single picture that makes visual sense.

Figure 6B:
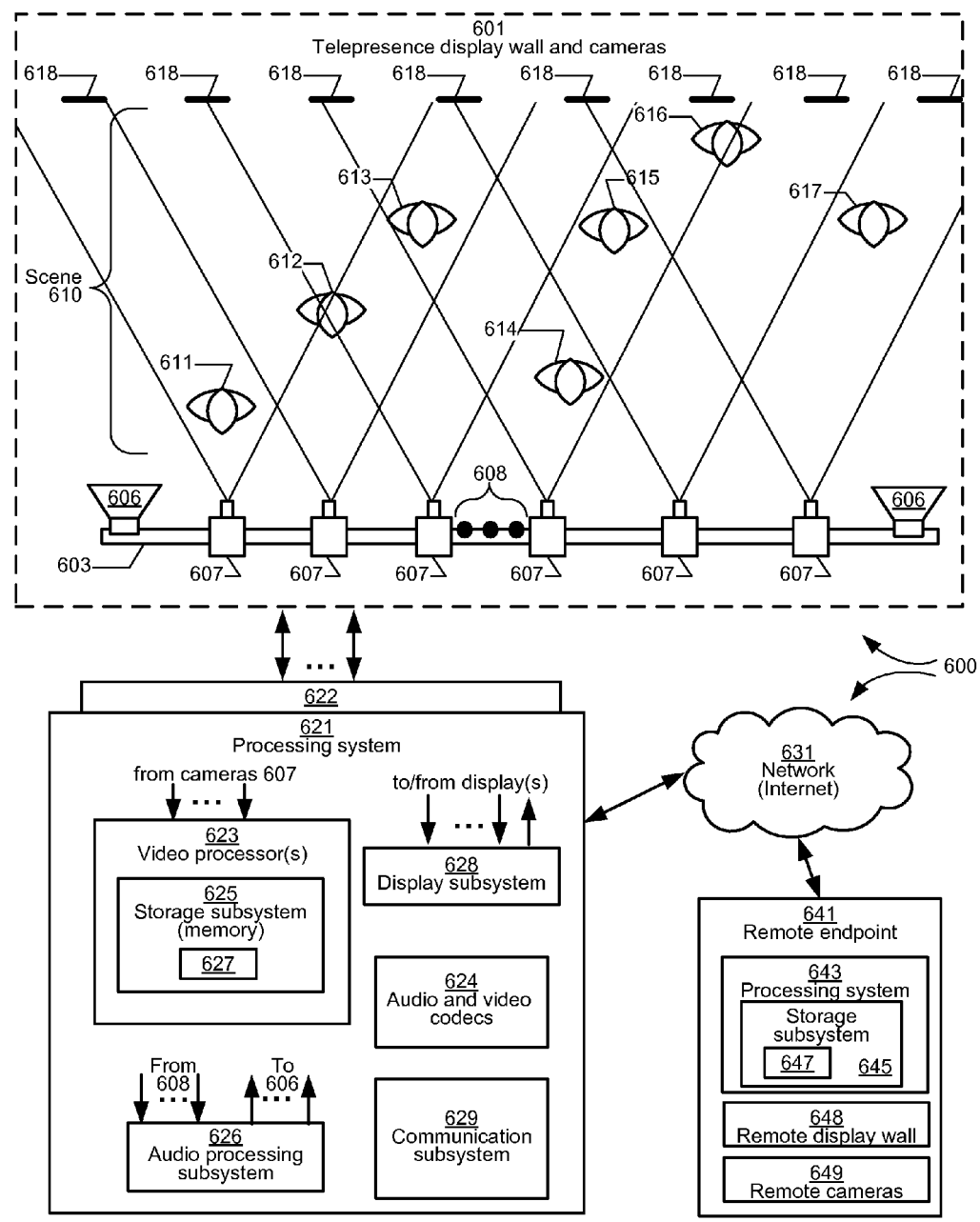
FIG. 6B shows a simplified block diagram of an apparatus according to an embodiment of the present invention.

FIG. 6B shows a simplified block diagram of an apparatus that includes the display wall and cameras apparatus 601 shown in FIG. 6A in an apparatus 600 and that further includes an interface 622 configured to accept data from and provide data to the elements of the display wall and cameras 601, including to accept individual scenes as signals captured from the video cameras 607. The interface 622 is in a processing system 621 that includes one or more video processors 623 coupled to the cameras 607 and a storage subsystem 625 including memory and possible one or more other storage elements. A storage medium in storage subsystem 625 is encoded with, i.e., is configured with, i.e., includes logic 627 as executable instructions that when executed by the video processor(s) determines an integrated depth map of the scene. Some embodiments directly determine the depth map from all cameras. One example of such a method uses structured lighting in the environment. Other such methods that directly can determine the depth map include plane sweeping.

In some embodiments, logic 627 comprises executable instructions that when executed by the video processor(s) determines a plurality of depth-maps through stereoscopic vision processing of pairs of signals from the respective pairs of cameras 607, and logic that when executed integrates the depth maps determined from the stereo pairs to determine a three-dimensional depth map of the scene 610.

Alternate embodiments include logic in the form of circuits. In yet other embodiments, the logic is in the form of hardware logic combined with memory storing instructions. In any of these embodiments, the logic when operating causes determining the depth-maps.

The logic in much of the rest of the description will be assumed to be, but is not limited to part of logic shown as 627 in FIG. 6B. The logic 627 is further configured when operating to process the signals from the cameras and the determined integrated depth-maps to synthesize a particular view of the scene in front of the cameras 607. The particular synthesized view of the scene is from a viewpoint that is in the opposite side of the display wall than the scene, and is substantially far from the scene 610 and as if the display wall 603 was not present.

The cameras 607 and processing system are arranged to be inconspicuous to give the general impression of "telepresence" even when the scene 610 includes participants and/or objects at various respective depths that may be unknown.

Figure 6C:
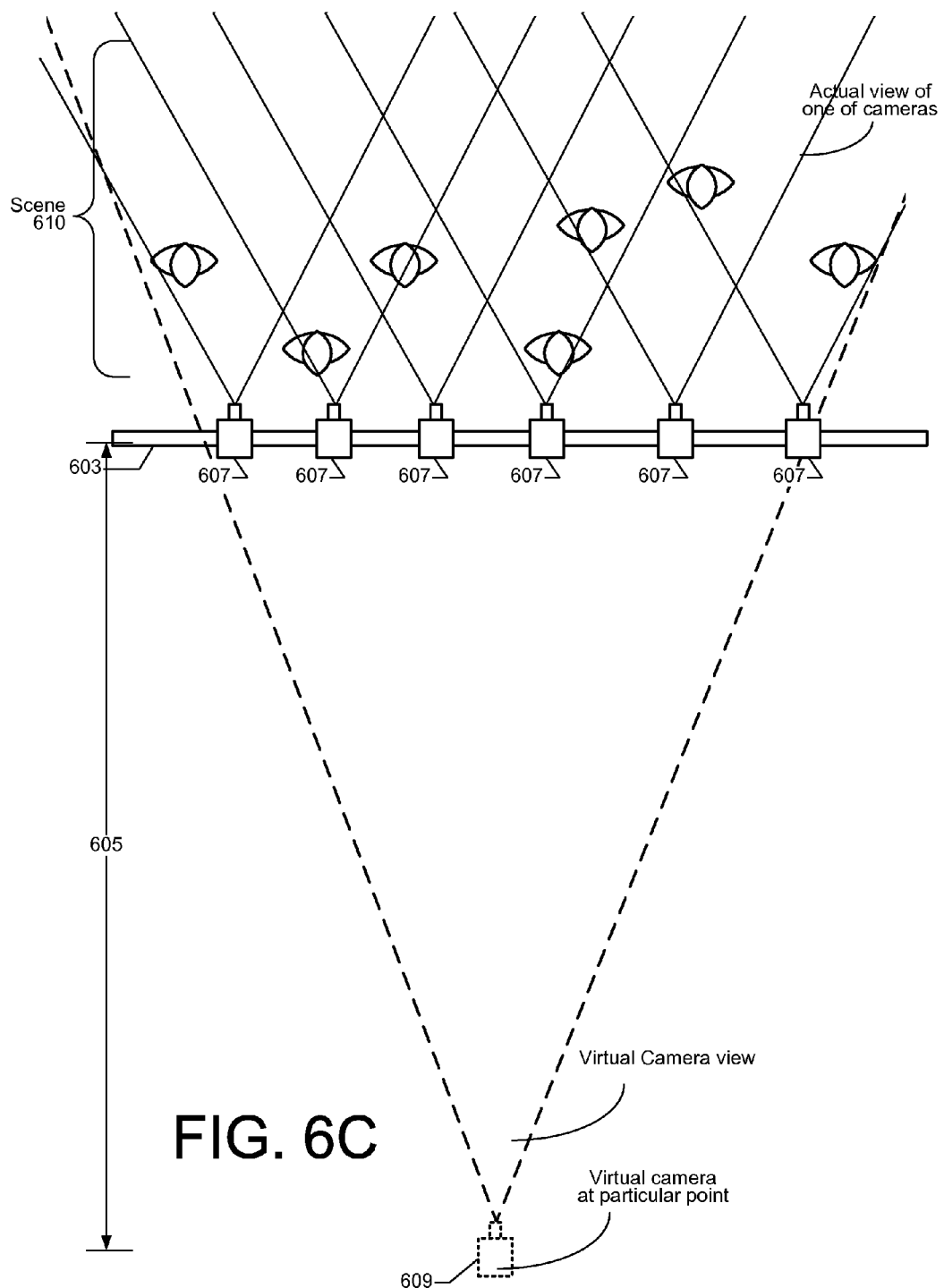
FIG. 6C shows the geometry of a particular view of the scene as viewed from a virtual camera at a particular point at a particular distance from the display wall on the opposite side of the display wall than the scene, and as if the display wall was not present.

The processing is configured to generate a virtual view from a virtual point at a substantial distance 605 that is behind the display wall 603 and as if the display wall was not present. FIG. 6C shows a particular view of the scene 610 as viewed from a virtual camera 609 at a particular point at a particular distance 605 from the display wall 603 on the opposite side of the display wall than the scene 610, and as if the display wall was not present. The particular distance 605 of the particular point is at least the width of the display wall, and typically is meters away. The particular distance is such that the particular view does not suffer from distortion that would be produced from a camera that is relatively close to the display wall.

Figure 6D:
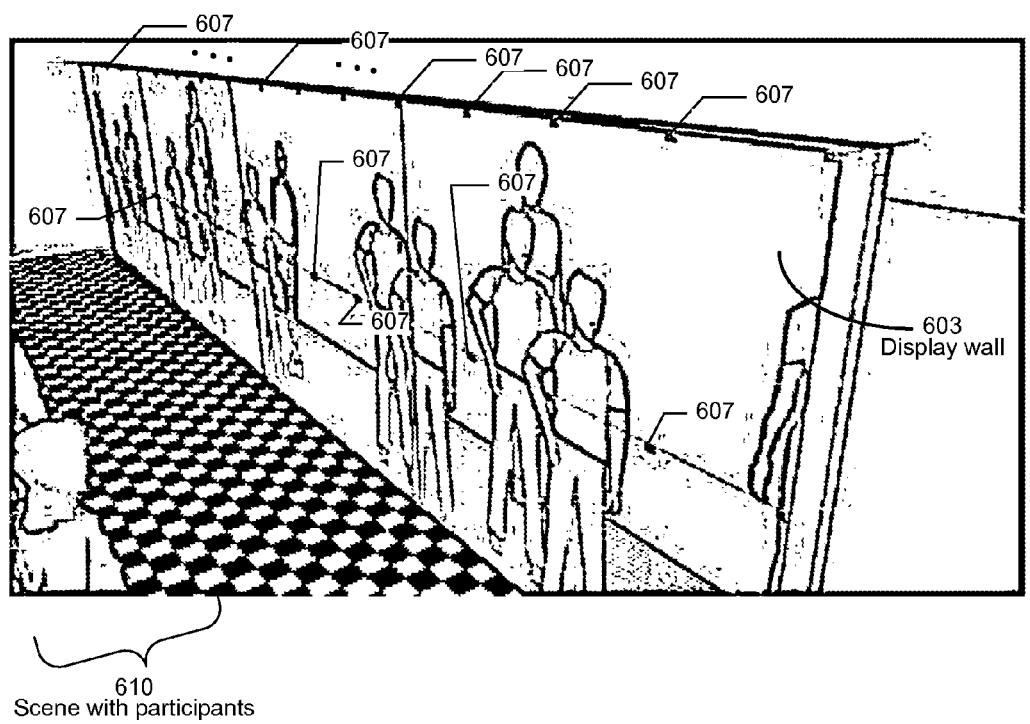
FIG. 6D shows a simplified sketched rendering of a display wall and cameras of the apparatus shown in FIG. 6B.

FIG. 6D shows a simplified sketched rendering of a display wall 603, showing a two dimensional array of cameras 603 along two lines on the display wall which is in front of participants of a scene 610. The display wall shows participants at a remote location that are in front of remote endpoints that includes a remote display wall apparatus.

Returning to the block diagram of FIG. 6B, the apparatus 600 includes an audio processing subsystem 626, in one embodiment including one or more DSP devices. The audio processing subsystem 626 is coupled to an array of microphones 608 and accepts signals therefrom to process into audio to be encoded and sent to other endpoints. The audio subsystem 626 also is coupled to one or more loudspeakers 606 to provide sound in the display wall environment from signals sent from one or more other endpoints.

One embodiment uses one or more graphic processing units (GPUs) as the video processor(s) 623. Alternate embodiments use one or more other types of processor. Yet other embodiments use a combination of general purpose processors with specialized processors such as DSP devices and/or GPUs.

The display wall 603 that includes either an array of display devices or one or more projected images is coupled to a display subsystem 628 shown in this embodiment as part of the processing system 621, but that can be separate from but coupled to 621

The apparatus, e.g., processing system 621 includes a set of codecs 624 including at least one audio code coupled to the audio processing subsystem 626 and at least one video codec coupled to the video processor(s) 623. In one embodiment, the video codes include an array of connected video codec that operate in parallel but that are interconnected, so that high definition video signals (1920 by 1080 at 60 frames per second) can be encoded and also decoded.

The apparatus 600, e.g., processing system 621 includes a communication subsystem 629 that is coupled to a network 631, e.g., the Internet at one end, and to the audio and video codecs 624 at the other end. Thus the telepresence apparatus 600 is couple via the network 631 to at least one remote endpoint 641. The purpose of the telepresence apparatus 600 is to provide signals for the at least one remote endpoint 641. The endpoint 641 as shown includes a remote display wall 648, one or more remote cameras 649, and a remote processing system 643 with a processor and a remote storage subsystem 645, e.g., with instructions 647 for the processing system 643 to cause the remote endpoint when operating and communicating with the telepresence apparatus 600 to provide each remote participant at the remote endpoint 641 viewing video at the remote display wall 648 with a sense of visual presence of the local scene 610 including the local participants 611 through 617.

Similarly, in the case the remote endpoint includes processing as described herein, the remote cameras 649 in combination with the processing system 643 when instructed by instructions 647 on processor 645 cause a remote scene to be processed and sent to the telepresence apparatus 600 such that any of the participants in scene 610 have the visual impression of the remote participants being present on the local display wall 603.

Details of how the communication subsystem 629 operates are well understood. How to incorporate such communication functions of communication subsystem 629 is well understood by those in the art so that no further details need to be provided herein to enable the embodiments described herein.

Figure 7:
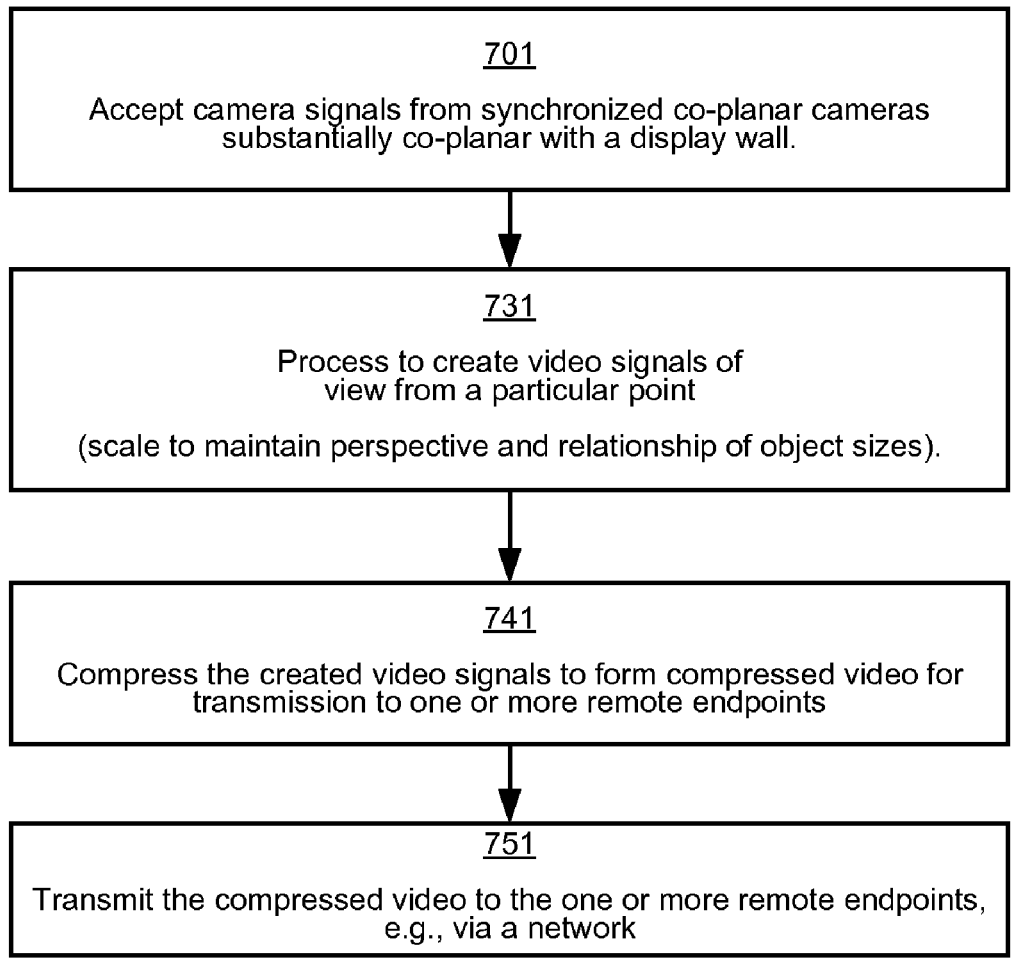
FIG. 7 shows a simplified flowchart of an embodiment of a method of operating a videoconference apparatus, such as the apparatus of FIG. 6B.

FIG. 7 shows an embodiment of a method of operating a videoconference apparatus, such as apparatus 600. The method includes in 701 accepting at an interface camera signals from a plurality of cameras 607 that are synchronized, e.g., frame-synchronized and that are aimed at a scene 610. The cameras are placed substantially co-planar with a display wall and distributed so that the camera views together cover the scene. There are typically a plurality of objects and/or participants in the scene that are at different typically unknown distances from the display wall, and hence from individual cameras. The camera views of camera signals from different cameras thus include participants/objects that are at different sizes in the different camera signals. The method further includes in 731 processing the camera signals to create video signals that represent a particular view of the scene 610 as viewed from the particular point at a particular distance 605 from the display wall 603, as if the display wall was not present. The particular distance 605 of the particular point is at least the width of the display wall, and typically is meters away. The processing 731 of the camera signals includes scaling of parts of the scene to create the signal of the particular view, such that participants and/or objects in camera signals from a particular camera that are further away from the particular camera are enlarged relative to objects in camera signals from another camera that are close to the other camera. That is, the synthetic view compensates for differences in size of any objects/and or participants due to their possibly different distance(s) from the spatially distributed video cameras 607, such different distance(s) typically unknown in advance. In general, the synthetic view decreases the difference in size of the participants in view 610 due to their distance, compared to any view from any single camera 607.

The method further includes compressing the created video signals in the video codec portion of codecs 624 to form compressed video for transmission to one or more remote endpoints. Embodiments of the method further include transmitting the compressed video to the one or more remote endpoints via the communication subsystem 629 coupled to the network, i.e., via the network, e.g., the Internet. In one embodiment, the signal transmitted include not only the compressed video but also compressed audio from the audio processing subsystem 626 coupled to the microphones 608.

One embodiment includes calibration to ascertain the exact physical location of the cameras, their orientation and zoom, and also any radial distortion due to their lenses.

In one embodiment, to create a particular view of the scene as viewed from a particular distance 605 as if the display wall was not present includes creating an integrated depth map of the scene 610 from the camera views. In some embodiments, this is carried out by directly processing the camera views. In some embodiments, creating an integrated depth map includes creating disparity maps between individual cameras by operating on sets of views of pairs of cameras, and integrating the disparity maps to create an integrated depth map of the scene 610.

The method further includes synthesizing the synthetic view as if from the synthetic camera 609 at the particular point behind the display wall 603 using the camera scenes and using the integrated depth map. The synthesizing includes using image warping of the scenes from one or more of the cameras 607, which scene from which camera being warped according to where objects and/or persons are determined to be in the integrated depth map and camera views. In one embodiment, signals corresponding to different potions of more than one view, suitably warped, are combined to determine images of objects at different respective depths and these images of objects are merged to form the synthetic view at a viewpoint in the form of video for transmission.

Figure 8:
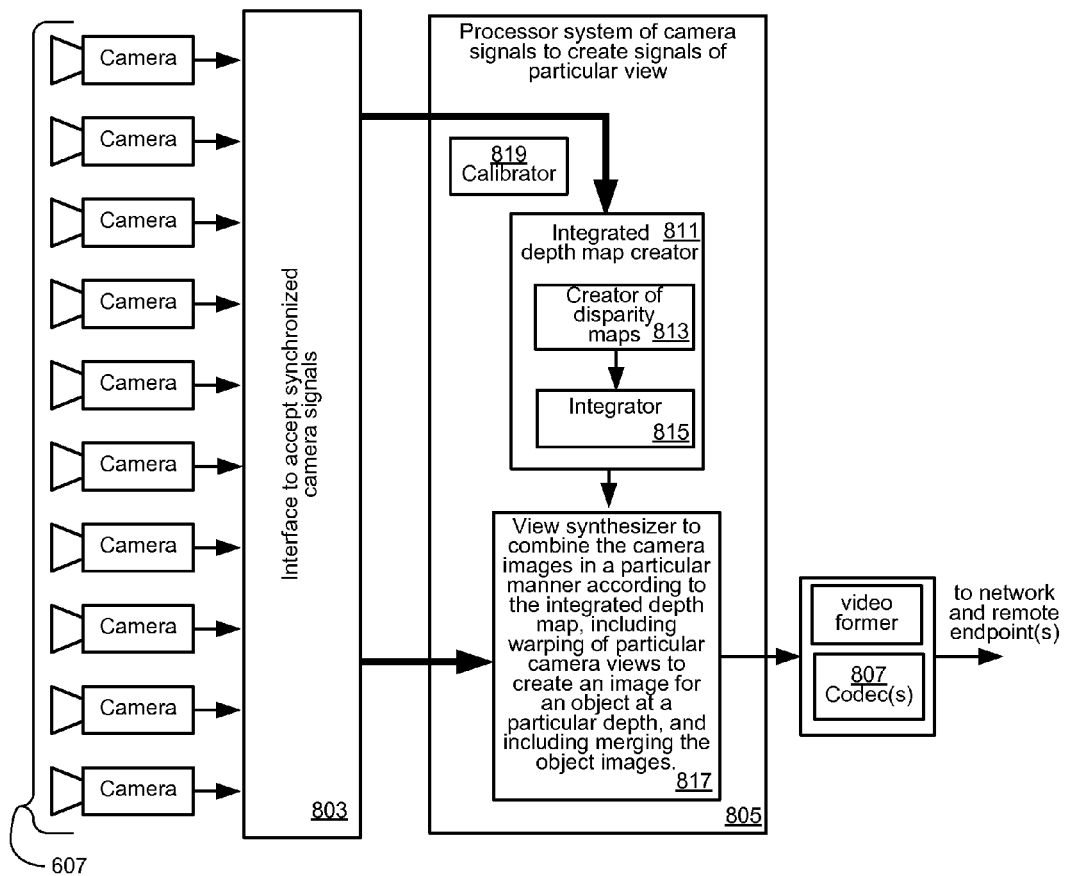
FIG. 8 shows a block diagram of portions of the apparatus embodiment shown in FIG. 6B.

A block diagram of one apparatus embodiment is shown in FIG. 8. The basic components processes are an interface 803 configured to accept camera views from the synchronized, e.g., frame-synchronized cameras 607. The respective camera views are represented by camera signals from respective cameras of the plurality of cameras 607. Each camera is aimed at a scene 610. The interface 803 is typically part of interface 622. A camera view processor system 805 configured to process the camera views is coupled to cameras via the interface 803 and is configured to create signals corresponding to of particular view at a particular point that is one the opposite side of the display wall and at a substantial distance therefrom. The processor includes an integrated depth map creator 813 configured to create a 3D depth map of the scene 610. While some embodiments include a depth map creator 813 that operates on all camera views to directly generate a depth map, by first, for example, using structured lighting to light the scene 610, or by using a method such as plane sweeping, some embodiments of the depth map creator module 813 includes a disparity creator module 813 to create disparity maps between individual cameras by operating on sets of views of pairs of cameras, and an integrator module 815 configured to create an integrated depth map of the scene 610. The camera view processor system 805 further includes a view synthesizer 817 coupled to and configured to accept the camera scenes from the interface 803 and configured to combine the camera views from cameras 607 in a particular manner according to the integrated depth map from integrator 815, including warping of particular camera views to create an image for an object at a particular depth substantially far from the display wall, and including merging the object images to create a synthetic view at a viewpoint. The apparatus further includes a video forming module configured to form video from synthetic views at different successive frame times, the formed video for transmission to one or more remote endpoints.

In one embodiment, the modules 813, 815, and 817 comprise the video processor(s) 623 and include respective portions of the storage subsystem that include respective portions of code in 627 that when executed cause the functions of the modules 813, 815, and 819 to be performed. In alternate embodiments, the modules 813, 815, and 817 include special purpose hardware configured to perform the herein described functions. Note those in the art understand how a program can be used to design the appropriate set of logic gates of such special purpose hardware, e.g., even automatically by compiling software descriptions to implement the hardware design that can then be fabricated as hardware.

The apparatus further includes a codec module 807 coupled to the processor system 805 configured to compress the generated video from processor system 805 to send to one or more remote endpoints.

The elements of the method of FIG. 7 and of apparatus of FIGS. 6A-6D and/or FIG. 8 is described in more detail as follows.

Image Based Rendering

As in any invention, the individual elements themselves of embodiments of the invention are known, but not in the inventive combination shown. The embodiments described herein are implemented with elements that use known techniques. Hence, in the interest of brevity, some of the details of implementing the individual elements in embodiments of the invention are only described herein by referring to techniques for the elements, and providing a reference to public information so that one of ordinary skill in the art also can implement the inventive combination. The descriptions of embodiments thus are enabled as required by patent law without making the written description unduly long.

Camera Calibration

One embodiment includes Calibration to determine, e.g., ascertain camera parameters of the cameras 607, including in one embodiment ascertaining one or more of: the exact physical locations of the cameras, their orientations and zooms, and also any radial distortions due to their lenses.

The apparatus 600 includes one or more calibration targets 618. The view processor 805 includes a calibration module to determine the camera parameters. In the case a room with a set of cameras 607 that are fixed, calibration is carried our once only. In one embodiment, the scene 610 includes the calibration targets 618 at pre-defined locations, e.g., along in the back wall of the room of the scene 610. Each calibration target 618 is pre-defined, e.g., has pre-defined characteristics such as shape and size(s), and is at a fixed location. In alternate methods, a target is moved in the scene at part of a calibration process.

While many calibration methods are known, one embodiment uses the method described in Zhang, Z. A flexible new technique for camera calibration. IEEE *Transactions on Pattern Analysis and Machine Intelligence*, Vol. 11, pp. 1330-1334, 2000.

Stereo Disparity

One embodiment of the method, e.g., as implemented by module 813 includes creating disparity, e.g., disparity maps between views from selected pairs of cameras 607. The pairs are selected to be closely spaced, e.g., adjacent. The disparity map creating includes comparing the views from the two closely spaced cameras using a search method. In one embodiment, the search is limited by the known geometry. The resultant disparity map for any pair of cameras represents the depth of objects and/or participants in the scene 610.

Many methods are known for determining disparity maps. One problem that occurs in creating disparity maps is occlusions. One embodiment for module 813 that includes determining occlusions uses a method that includes dynamic programming technique and described in A. Criminisi, J. Shotton, A. Blake, P. H. S. Torr, "Gaze Manipulation for One-to-one Teleconferencing," Proceedings, Ninth IEEE International Conference on Computer Vision (ICCV'03). The method uses a three-plane graph for dense-stereo dynamic-programming that encourages correct occlusion labeling, and view synthesis by direct projection of a minimum-cost surface for the dynamic programming. Furthermore, the method includes maintaining a time varying background model to enhance the rendering of occlusions and reduce such temporal artifacts as flicker. One version further includes cost aggregation that operated on the three-dimensional matching cost space.

One embodiment uses the method described in A. Criminisi, J. Shotton, A. Blake, C. Rother, P. H. S. Torr, Efficient Dense Stereo with Occlusions for New View-Synthesis by Four-State Dynamic Programming, International Journal of Computer Vision archive, Volume 71, Issue 1, Pages: 89-110, (January 2007) and, includes a dynamic programming technique for separating occlusions from depth information in a computationally efficient way. For more details on the dynamic program methods applied to determining disparity maps using a single camera or using a pair of stereo cameras, see also the following U.S. Patent Application publications: US 20080317386 titled PLAYBACK OF DIGITAL IMAGES; US 20070031037 titled STEREO IMAGE SEGMENTATION; US 20060285747 titled IMAGE SEGMENTATION; US 20060193509 titled STEREO-BASED IMAGE PROCESSING; US 20050283730 titled SYSTEM AND PROCESS FOR VIEWING AND NAVIGATING THROUGH AN INTERACTIVE VIDEO TOUR; US 20050232510 titled VIRTUAL IMAGE GENERATION; US 20050232509 titled VIRTUAL IMAGE ARTIFACT DETECTION; and US 20050078866 titled VIRTUAL CAMERA TRANSLATION; and US 20050078865 titled GAZE MANIPULATION. The contents of each of these U.S. patent applications are incorporated herein by reference.

In more detail, the method of module 813 includes a closely spaced pair of synchronized cameras of cameras 607, e.g., adjacent ones of cameras 607, computing a minimum cost path in a stereo disparity model between a scan line of an image from one camera of the pair and a corresponding scan line of the second image of the pair. The stereo disparity model distinguishing between matched pixels that are on a surface that is substantially parallel to an axis connecting the pair of cameras and occluded pixels in each scan line. In one version, the computing operation includes computing matching costs for each pixel of each scan line pair. This can use a windowed matching cost function. The method includes in one version altering the matching costs for at least one pixel pair based on whether the pixel pair is determined to be associated with a surface that is substantially parallel to an axis connecting the pair of camera or an occlusion.

In one embodiment of the disparity calculating method, the computing operation includes determining a minimum cost path in the stereo disparity model, and applying such a cost penalty to a move from an occluded pixel pair to a matched pixel pair. The move from the occluded pixel pair is to another occluded pixel pair. A first cost penalty is applied to the move from the occluded pixel pair to the other occluded pixel pair, and applying a second cost penalty to a move from a matched pixel pair to an occluded pixel pair. The two cost penalties are best different. For example, the first cost penalty is than the second cost penalty.

The disparity map determining method in an embodiment of 813 further includes computing a virtual image as if from a single virtual camera scan line based on corresponding pixels of the scan lines of the each image from the pair of cameras. A disparity of the corresponding pixels is characterized by a minimum cost path of the stereo disparity model. In one version, corresponding pixels that are matched are projected as a virtual pixel onto a virtual image as if from a single virtual camera scan line. In one version, corresponding pixels are averaged to determine a value of a resulting virtual pixel on a virtual image as if from a single virtual camera scan line.

In a particular implementation, a non-occluded pixel of an occluded pair of corresponding pixels is projected as a virtual pixel onto a virtual image as if from a single virtual camera scan line from a background disparity in the stereo disparity model. A value of a non-occluded pixel of an occluded pair of corresponding pixels is selected as a value of a resulting virtual pixel on a virtual image as if from a single virtual camera scan line.

One embodiment further includes segmenting the camera images from cameras 607 in the depth maps into objects by classifying each pixel as belonging to an object image, e.g., a pixel belonging to a participant, or to the background. Such a method includes a modification of the depth map determining, including for each accepted pair of frames for a pair of synchronized cameras of cameras 607, defining an energy function based at least in part on a stereo disparity, a stereo matching, and a color of at least a portion of the plurality of pixels in each frame, and using method that determines a segmentation state variable value for each of the at least a portion of the pixels using an extreme value (minimum or maximum) finding method for the energy function. Each segmentation variable indicates the segmentation, e.g., and may be a foreground pixel indicator and a background pixel indicator. In addition, a segmentation variable may be an occluded pixel indicator. One segmentation method is as described in U.S. Patent Application publication No. US 20070031037 titled STEREO IMAGE SEGMENTATION, the contents of which are incorporated herein by reference.

Yet another embodiment of the disparity map determining in 813 includes using a method described in C. Lawrence Zitnick, Sing Bing Kang, Matthew Uyttendaele, Simon Winder Richard Szeliski: High-quality video view interpolation using a layered representation, International Conference on Computer Graphics and Interactive Techniques, ACM SIGGRAPH 2004 Papers, also in ACM Transactions on Graphics (TOG), Volume 23, Issue 3, Pages: 600-608, (August 2004). A copy may be obtained (retrieved on 23 Feb. 2009) at http://research~dot~microsoft~dot~com/users/larryz/ZitnickSig04~dot~pdf, where in this URL, and in all other URLs throughout this document, "~dot~" refers to the period "." in the actual URL. The method includes a pipeline for visually segmenting the scene into small areas of like color, and then estimating depth for these segments. The results are typically smoother than many methods that compute disparity on a pixel basis.

For more details of the method for module 813 that is passed on patches see the following U.S. Patent Application publications: US 20060114253 titled SYSTEM AND PROCESS FOR GENERATING A TWO-LAYER, 3D REPRESENTATION OF A SCENE; US 20060031917 titled COMPRESSING AND DECOMPRESSING MULTIPLE, LAYERED, VIDEO STREAMS EMPLOYING MULTI-DIRECTIONAL SPATIAL ENCODING; US 20060031915 titled SYSTEM AND PROCESS FOR COMPRESSING AND DECOMPRESSING MULTIPLE, LAYERED, VIDEO STREAMS OF A SCENE CAPTURED FROM DIFFERENT VIEWPOINTS FORMING A GRID USING SPATIAL AND TEMPORAL ENCODING; US 20060029134 titled SYSTEM AND PROCESS FOR COMPRESSING AND DECOMPRESSING MULTIPLE, LAYERED, VIDEO STREAMS EMPLOYING SPATIAL AND TEMPORAL ENCODING; US 20060028489 titled REAL-TIME RENDERING SYSTEM AND PROCESS FOR INTERACTIVE VIEWPOINT VIDEO THAT WAS GENERATED USING OVERLAPPING IMAGES OF A SCENE CAPTURED FROM VIEWPOINTS FORMING A GRID; US 20060028473 titled REAL-TIME RENDERING SYSTEM AND PROCESS FOR INTERACTIVE VIEWPOINT VIDEO; US 20050286759 titled INTERACTIVE VIEWPOINT VIDEO SYSTEM AND PROCESS EMPLOYING OVERLAPPING IMAGES OF A SCENE CAPTURED FROM VIEWPOINTS FORMING A GRID; US 20050286758 titled COLOR SEGMENTATION-BASED STEREO 3D RECONSTRUCTION SYSTEM AND PROCESS EMPLOYING OVERLAPPING IMAGES OF A SCENE CAPTURED FROM VIEWPOINTS FORMING EITHER A LINE OR A GRID; US 20050286757 titled COLOR SEGMENTATION-BASED STEREO 3D RECONSTRUCTION SYSTEM AND PROCESS; US 20050285875 titled INTERACTIVE VIEWPOINT VIDEO SYSTEM AND PROCESS; and US 20050285874 titled SYSTEM AND PROCESS FOR GENERATING A TWO-LAYER, 3D REPRESENTATION OF A SCENE. The contents of each of these published U.S. patent applications are incorporated herein by reference.

The invention is not limited to implementing the disparity map determining by the above mentioned methods. The depth information is derived in alternate embodiments of 813 by other processes, such as those using structured lighting. Many alternate methods would be known to those in the art for element 813 and the method step(s) therein.

Extracting a foreground element from a background image by estimating opacity for each pixel of the foreground element is determined according to a method described in Yung-Yu Chuang, Brian Curless, David H. Salesin, and Richard Szeliski. A Bayesian Approach to Digital Matting. In Proceedings of IEEE Computer Vision and Pattern Recognition (CVPR 2001), Vol. II, 264-271, December 2001, available (retrieved 23 Feb. 2009) at http://research~dot~microsoft~dot~com/vision/visionbasedmodeling/publications/Chuang-CVPR01~dot~pdf.

Depth Map Integration

In module 815, the multiple depth maps produced by module 813 are combined to form a unified three-dimensional (3D) model (a unified depth map) of the scene. Individual depth maps have blind spots and can also have errors in flat, featureless areas of the scene. Integration process of module 815 acts as a filter for individual arts of disparity maps and may use models to constrain the surfaces to plausible objects in the scene 610. Note that in embodiments of the invention, the integrated depth map is typically not a complete 3D model in that the map only contains data from one side of the room.

Many methods are known for integrating disparity maps, and alternate embodiments use different such methods. Such methods are summarized and compared in Steve Seitz, Brian Curless, James Diebel, Daniel Scharstein, and Richard Szeliski: A Comparison and Evaluation of Multi-View Stereo Reconstruction Algorithms, CVPR 2006, vol. 1, pages 519-526. A copy can obtained (retrieved 23 Feb. 2009) at http://vision~dot~middlebury~dot~edu/. That Seitz et al. paper includes citations to the methods summarized and compared, so that the alternate embodiments are sufficiently enabled in this description.

One embodiment for the integration module method is as described in Zach, C.; Pock, T.; Bischof, H., A Globally Optimal Algorithm for Robust TV-L1 Range Image Integration, Proceeding IEEE $11^{th}$ International Conference on Computer Vision (ICCV 2007), 4-21 Oct. 2007. A copy can be obtained (retrieved 23 Feb. 2009) at http://www~dot~icg~dot~tu~graz~dot~ac~dot~at/pub/pdf/iccv07_paper~dot~pdf. The method includes averaging of 3D distance fields determined from 2D distance maps, called 2.5D data. The result is the same as determining a (discrete) surface that minimizes of an underlying energy function. Simple averaging without further regularization causes inconsistent surfaces due to frequent sign changes of the average distance field. Therefore, one embodiment includes using an additional regularization force that is designed to favor a smooth geometry. For example, one method includes adding one or more terms in a cost function to penalize the surface area of the resulting 3D model, together with graph-cut algorithms and variational techniques. Alternately, one method includes directly determining a corresponding characteristic function from (oriented) point samples, wherein the smoothness of the obtained surface is enforced only implicitly.

One embodiment of the integrator module includes building high-quality 3D models from the set depth maps. The integration procedure is known to be robust against gross outliers occurring in the depth maps. This deals with isolated outliers e.g. at depth discontinuities or occlusions, and also includes large, but incorrectly matched background regions as well. The resulting 3D mesh has been found to be smooth.

The integration method includes minimizing an energy functional incorporating a total variation regularization term with a $L^1$ data fidelity term. Total variation minimization is known to lead to minimal surfaces and to include regularizing the resulting three-dimensional model. The method uses an $L^1$ norm to measure data fidelity. So using such a norm is known to be robust against outliers while still being convex. A globally convergent numerical method is used that combines the dual formulation of the total variation energy with a point-wise optimization scheme. The resulting method is computationally efficient.

Use of GPUs.

In one embodiment of the video processor(s) 623, one or more GPUs are used. In one embodiment of the invention, GPUs are used in the video processor(s) 623 to speed up computation of the depth maps in module 813. This works well with the method used for the integrator 815—the method in above-described Zach et al paper. Such GPU depth map methods are described in the following publications: C. Zach, M. Sormann, and K. Karner. High-performance multi-view reconstruction. In International Symposium on 3D Data Processing, Visualization and Transmission (3DPVT), 2006. G. Vogiatzis, P. Torr, and R. Cipolla. Multi-view stereo via volumetric graph-cuts, in Proceedings, IEEE Conference on Computer Vision and Pattern Recognition (CVPR), pages 391-398, 2005. R. Yang and M. Pollefeys. Multi-resolution real-time stereo on commodity graphics hardware. In IEEE Conference on Computer Vision and Pattern Recognition (CVPR), pages 211-217, 2003. N. Cornelis and L. Van Gool. Real-time connectivity constrained depth map computation using programmable graphics hardware, in Proceedings, IEEE Conference on Computer Vision and Pattern Recognition (CVPR), pages 1099-1104, 2005. Different embodiments use such GPU-based methods.

An alternate embodiment of integrator module 815 used the integration method described in Merrell, P. Akbarzadeh, A. Liang Wang Mordohai, P. Frahm, J.-M. Ruigang Yang Nister, D. Pollefeys, M. Real-Time Visibility-Based Fusion of Depth Maps, Proceedings, International Conference on Computer Vision, 2007. ICCV 2007. 14-21 Oct. 2007: Rio de Janeiro. A copy is available (retrieved 23 Feb. 2009) at www~dot~cs~dot~unc~dot~edu/~mordohai/public/Merrell_DepthMapFusion07~dot~pdf. The alternate integrator module 815 is implemented in the embodiment of the video processor(s) 623 that uses one or more GPUs.

Occluded Surface Prediction

One embodiment of the invention includes temporal occlusion filling using occlusion prediction. At a given moment in time, e.g., for a particular set of frames from the cameras 607, a foreground object, e.g., a person may have (just) moved to be in front of a particular camera, and thus block the view for that camera of a different object, e.g., person that is further away from the camera. The occluded object, however, is desired typically to be visible in the synthesized view. In many known methods, at least two views of an object are required to determine the depth for the depth map. One embodiment of the invention includes a store of recent past frames of camera views to estimate the depth and appearance of a presently occluded object. In one version, to keep the storage requirements modest, the past store is of borders, e.g., bounding boxes of objects determined in the determining of depth maps. A current depth map with a hole and/or a surface view with a hole is filled in using past information.

Viewpoint

It is known to render a combination of a plurality of images from different camera locations to a viewpoint. In such known rendering methods, the decision to where the viewpoint is located is typically postponed until rendering time. Furthermore, the point is typically restricted to be a point within the plane of the cameras. For example, gaze-correction methods are known to change the viewpoint to be midway between the left and right camera of a pair of cameras.

Embodiments of the present invention use a particular point 609 that is not in the plane of the cameras, but rather behind the display wall plane 603 where the cameras 607 are located, at a substantial distance 605 therefrom. By the camera being substantially far is meant that the camera is at a distance selected to be sufficiently far away from the display wall and thus from the scene 610 such that a remote participant that is looking at a remote display wall appears locally to also be looking at the camera. The effect of this viewpoint is that people looking at the wall are also looking at the camera, and the amount of perspective foreshortening is reduced, such that so the relative sizes of participants of the scene appear the same in the generated particular view as their actual relative sizes. That is, the participants appear in the generated particular view as if as they are all at an equal distance from the display wall. That is, like size objects and/or participants appear the same size.

In one embodiment in which the display wall is wall-sized, the image is scaled so that everyone in the rendered image is rendered about life-size.

In one embodiment, the viewpoint is the orthogonal perspective, also called parallel perspective, in which there is no diminishment of size with increased distance from the display wall, such direction called the z-direction herein. This allows the video wall to be extended to arbitrary length while the effective camera view is always shooting perpendicular to the wall.

Figure 9:
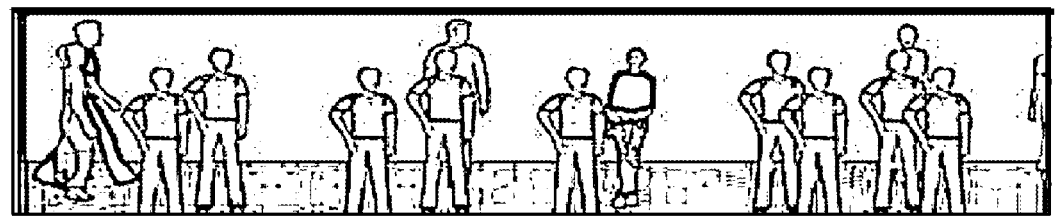
FIG. 9 shows a simple sketch of a synthesized image of participants in front of cameras when the viewpoint is sufficiently far away such that there is approximately orthogonal perspective.

FIG. 9 shows a simple sketch of a synthesized image of participants in front of the cameras 607 when the viewpoint is sufficiently far away such that there is approximately orthogonal perspective. There is no scaling with depth in such a situation.

Rendering

In one embodiment, the scene renderer 817 includes an implementation of a combined z-buffer. Scene renderer 817 in such an embodiment is configured to render the image using a z-buffer by filling in the frame of the image in z-buffer order from closest to the plane of the display wall 603, hence of the cameras 607 and moving further away, i.e., from back to front. For each z location in the three-dimensional depth map, i.e., for each plane, for any segment of the image in the three-dimensional depth map, pixels from camera views of cameras that are nearest the object, e.g., that are nearest to the intersection of the display wall plane 603 and the line from the camera to the point on the segment, unless such a camera view has an occluded video of that object. In the case of the view of that segment from the nearest camera being occluded, then pixels from a further away camera is selected. In one embodiment, the pixels from the selected cameras are warped to be at the new view angle, according to the local 3D dimensions from the depth map.

One implementation determines, for each plane of any determined objects/participants in the integrated depth map, for each ray, which camera view(s) to use to determine the rendering, in order of closeness of each camera to the ray's crossing the plane of the cameras (and thus plane of the display wall 603).

One embodiment uses a plane sweeping method that includes examining multiple camera views and determining agreement or disagreement amongst the camera views. If all camera views of a particular plane agree, the views are marked as correct, and one or more of the closest cameras are used. Otherwise, if there is disagreement, the camera views are further processed to eliminate at least one view.

Some embodiments of plane sweeping can include determining the depth maps by examining all camera views, hence also incorporates the function of module 811. One embodiment of plane sweeping includes discretizing the 3D space of the view 610 into planes parallel to the plane of the display wall. The method steps through the planes in order of increasing z, i.e, starting with the closest plane to the display wall. For each plane, the camera views are projected onto the plane. Now for each pixel in the selected, there is a corresponding (x,y) pixel in the camera images projected onto the plane. For each pixel location (x,y) in the selected plane, the mean and variance of the pixel values (the colors) are computed. Thus a variance is computed for every pixel in every plane. In one embodiment, the final color of (x,y) is selected to be the color with minimum variance. In an alternate embodiment, the final color of (x,y) is selected to be the color most consistent among all camera views.

One improved method used in one embodiment is as described in Gallup, D. Frahm, J.-M. Mordohai, P. Qingxiong Yang Pollefeys, M.: Real-Time Plane-Sweeping Stereo with Multiple Sweeping Directions, Proceedings, IEEE Conference on Computer Vision and Pattern Recognition, 2007. CVPR'07, 17-22 Jun. 2007, Minneapolis, Minn., also available (retrieved 7 Mar. 2009) at www~dot~cs~dot~unc~dot~edu/~marc/pubs/GallupCVPR07~dot~pdf. This plane sweeping method is used in embodiments in which one or more GPUs are included in video processor(s) 623.

One enhanced embodiment uses for the view synthesizer 817 is a method described in above-mentioned C. Lawrence Zitnick, Sing Bing Kang, Matthew Uyttendaele, Simon Winder Richard Szeliski: High-quality video view interpolation using a layered representation, International Conference on Computer Graphics and Interactive Techniques, also in ACM Transactions on Graphics (TOG), Volume 23, Issue 3, Pages: 600-608, (August 2004). Also available at (retrieved 23 Feb. 2009) at http://research~dot~microsoft~dot~com/users/larryz/ZitnickSig04~dot~pdf. The edges of objects are crucial to natural appearance. Pixels at the edge of a slightly defocused object contain color mixed from the object and the background. This is used to determine edges for segmentation. The method effectively separates the images and the defocused image, and combined using an alpha channel for transparency, so that during rendering the edge of an object would have some transparency. This soft edge matting process increases the naturalness and decreases artifacts.

One embodiment of rendering uses a plane sweeping method described in Gallup, D. Frahm, J.-M. Mordohai, P. Qingxiong Yang Pollefeys, M.: Real-Time Plane-Sweeping Stereo with Multiple Sweeping Directions, Proceedings, IEEE Conference on Computer Vision and Pattern Recognition, 2007. CVPR '07, 17-22 Jun. 2007, Minneapolis, Minn., also available (retrieved 7 Mar. 2009) at www~dot~cs~dot~unc~dot~edu/~marc/pubs/GallupCVPR07~dot~pdf. This plane sweeping method is used in embodiments in which one or more GPUs are included in video processor(s) 623.

Thus some method embodiments and some apparatus embodiments have been described. Also have been described are embodiments of a tangible computer readable storage medium containing code that when executed by a one or more processors, carry out functions described herein. Such medium includes a tangible computer readable storage medium with code that when executed cause carrying out the function of module 813. Furthermore, such medium includes a tangible computer readable storage medium with code that when executed cause carrying out the function of module 815. Furthermore, such medium includes a tangible computer readable storage medium with code that when executed cause carrying out the function of module 819.

While methods usable in each module of the apparatus of FIG. 8, and for the steps of the method have been described, alternate embodiments of these modules use alternate implementations and techniques, and different embodiments of the invention include such alternate methods for each of the modules and parts thereof. The field of image processing for Virtual View Generation, View Synthesis, Image Based Rendering, Morphing is vast, and many suitable methods are known for one or more of the elements that when combined form the novel combinations described herein.

See for example, Bibliography on Virtual View Generation, View Synthesis, Image Based Rendering, Morphing, available at (retrieved 23 Feb. 2009) www~dot~visionbib~dot~com/bibliograhy/describe493~dot~html and http://www~dot~visionbib~dot~com/bibliography/describe490~dot~html.

See also Heung-Yeung Shum and Sing Bing Kang: A Review of Image Based Rendering Techniques, IEEE/SPIE Visual Communications and Image Processing, pp 2-13, 2000, also available (retrieved 23 Feb. 2009) at http://research~dot~microsoft~dot~com/pubs/68826/review_image_rendering~dot~pd f.

See also Richard Szeliski, Image Alignment and Stitching: A Tutorial, *Foundations and Trends in Computer Graphics and Computer Vision*, Vol. 2, No 1, pp. 1-104, December 2006, available at (retrieved 6 Mar. 2009) http://research~dot~microsoft~dot~com/pubs/75695/Szeliski-FnT06~dot~pdf.

See also Aseem Agarwala, Maneesh Agrawala, Michael Cohen, David Salesin, Richard Szeliski: Photographing Long Scenes with Multi-Viewpoint Panoramas, ACM Transactions on Graphics, Vol. 25, No. 3, Pp. 853-861, August 2006. Also available (retrieved 5 Mar. 2009) at. http://research~dot~microsoft~dot~com/en-us/um/people/cohen/longthingsp~dot~pdf.

Sing Bing Kang, Richard Szeliski, Extracting View-Dependent Depth Maps from a Collection of Images, International Journal of Computer Vision, Vol. 139-163, No. 2, pp. 139-163, July 2004, retrieved 23 Feb. 2009 at http://research~dot~microsoft~dot~com/pubs/75582/Kang-IJCV04~dot~pdf.

See also Peter Rander: A Multi-Camera Method for 3D Digitization of Dynamic, Real-World Events, PhD Dissertation, The Robotics Institute, Carnegie Mellon University, Pittsburgh, Pa. 15213-3890 USA, 1998. Retrieved on 23 Feb. 2009 at http://www~dot~cs.cmu~dot~edu/~virtualized-reality/papers/Rander98/ri-tr-98-12~dot~pdf.

See also E. Cooke, I. Feldmann, P. Kauff, O. Schreer, "A Modular Approach to Virtual View Creation for a Scalable Immersive Teleconferencing Configuration", Proc. of Int. Conf. on Image Processing (ICIP 2003), pp. 41-44, Barcelona, Spain, September 2003. Retrieved 23 Feb. 2009 at http://ip~dot~hhi~dot~de/imedia_G3/assets/pdfs/icip03_SCAB~dot~pdf.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Note that when a method is described that includes several elements, e.g., several steps, no ordering of such elements, e.g., steps is implied, unless specifically stated.

The methodologies described herein are, in one embodiment, performable by one or more processors that accept computer-readable (also called machine-readable) logic in some embodiments encoded on one or more tangible computer-readable storage media containing a set of instructions that when executed by one or more of the processors carry out at least one of the methods described herein, while in other embodiments encoded as hardware elements with or without programmable element(s). In the case of instructions, any processor capable of executing a set of instructions (sequential or otherwise) that specify actions to be taken are included. Thus, one example is a typical processing system that includes one or more processors. Each processor may include one or more of a CPU, a graphics processing unit (GPU), and a programmable DSP unit. The processing system further may include a memory subsystem including main RAM and/or a static RAM, and/or ROM. A bus subsystem may be included for communicating between the components. The processing system further may be a distributed processing system with processors coupled by a network. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries logic (e.g., software) including a set of instructions to cause performing, when executed by one or more processors, one of more of the methods described herein. The software may reside in the hard disk, or may also reside, completely or at least partially, within the RAM and/or within the processor during execution thereof by the computer system. Thus, the memory and the processor also constitute computer-readable carrier medium on which is encoded logic, e.g., in the form of instructions.

Furthermore, a computer-readable storage medium may form, or be included in a computer program product that is an article of manufacture by being configured during manufacture to incorporate the code, and in some versions to also incorporate one or more processing elements therewith.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a set-top box (STB), a terminal interface for a teleconferencing terminal, a web appliance, or be in a network router, switch or bridge, or any machine capable of executing a set of instructions (sequential or otherwise) that specify actions to be taken by that machine.

Note that while some diagram(s) only show(s) a single processor and a single memory that carries the logic including instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable storage medium configured with a set of instructions, e.g., a computer program that are for execution on one or more processors, e.g., one or more processors that are part of teleconferencing endpoint. Thus, as will be appreciated by those skilled in the art, embodiments of the present invention may be embodied as a method, an apparatus such as a special purpose apparatus, an apparatus such as a data processing system, or a tangible computer-readable storage medium, e.g., a computer program product. The computer-readable storage medium stores logic, e.g., in the form of sets of instructions that when executed on one or more processors cause a processor or processors to implement the elements described herein, or in the form of logic circuits. Accordingly, alternate embodiments of the present invention may take the form of a method, an entirely hardware embodiment, an entirely software embodiment or an embodiment combining software and hardware aspects. Furthermore, some embodiments of the present invention may take the form of a tangible computer-readable storage medium that include computer-readable program code embodied in the medium.

While the storage medium is shown in an example embodiment to be a single medium, the term "storage medium" should be taken to include a single medium or multiple storage media (e.g., a centralized or distributed database, and/or associated caches and servers) that store the one or more sets of instructions. A storage medium may take many forms, including but not limited to, non-volatile media and volatile media, Non-volatile media includes, for example, optical, magnetic disks, and magneto-optical disks. Volatile media includes dynamic memory, such as main memory. For example, the term "storage medium" shall accordingly be taken to include, but not be limited to, in one set of embodiment, a tangible computer-readable storage medium, e.g., a solid-state memory, or a computer software product—encoded in computer-readable optical or magnetic media forming an article of manufacture.

It will be understood that the steps of methods discussed are performed in one embodiment by an appropriate processor (or processors) of a processing (i.e., computer) system executing instructions stored in storage. It will also be understood that embodiments of the present invention are not limited to any particular implementation or programming technique and that the invention may be implemented using any appropriate techniques for implementing the functionality described herein. Furthermore, embodiments are not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the DESCRIPTION OF EXAMPLE EMBODIMENTS are hereby expressly incorporated into this DESCRIPTION OF EXAMPLE EMBODIMENTS, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All patents, and U.S. patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

I claim:

1. A telepresence apparatus comprising:
   a display wall;
   a plurality of synchronized video cameras substantially co-planar with the display wall providing respective camera views together covering a scene;
   an interface to accept the camera views;
   a camera view processor system to generate a synthetic particular view from a particular point on the opposite side of the display wall than the scene and at a substantial distance therefrom, the camera view processor system including:
   a depth map creator module to create an integrated depth map;
   a view synthesizer module to combine the camera views according to the integrated depth map, including warping of particular camera views to form the synthetic particular view at a viewpoint, including scaling the sizes of objects or participants to maintain perspective and the relationship of object sizes according to their respective distances to the display wall; and
   a video forming module to form video for transmission to one or more remote endpoints.

2. A telepresence apparatus, as recited in claim 1, wherein the substantial distance for the synthetic particular view is sufficiently far away from the display wall such that there is approximately orthogonal perspective, such that the relative sizes of participants of the scene appear the same in the generated particular view as their actual relative sizes.

3. A telepresence apparatus, as recited in claim 1, further comprising a codec module configured to compress the formed video for transmission.

4. A telepresence apparatus, as recited in claim 3, wherein the codec is coupled to a network to which a remote endpoint is coupled, such that the remote endpoint can receive formed and compressed video from the codec of the telepresence apparatus.

5. A telepresence apparatus, as recited in claim 3, further comprising a plurality of microphones and an audio processing module coupled to and configured to accept signals from the microphones and to generate audio time synchronized to the formed video, wherein the codec module includes one or more audio codecs to compress the generated audio to combine with the formed video for transmission to one or more remote endpoints.

6. A telepresence apparatus as recited in claim 1, wherein camera view processor system includes one or more programmable processors and a memory subsystem, and wherein each of the disparity creator module, the integrator module, and the view synthesizer module includes at least a respective portion of a tangible computer readable storage medium configured with instructions that when executed by one or more of the processors carry out the respective functions of the respective module.

7. A telepresence apparatus as recited in claim 6, wherein the one or more processors include one or more graphic processing units.

8. A telepresence apparatus as recited in claim 1, further comprising one or more calibration targets, wherein the camera view processor includes a calibrator module to ascertain camera parameters of the cameras.

9. A telepresence apparatus as recited in claim 1, wherein the integrated depth map creator module comprises:
   a disparity creator module configured to create disparity maps between individual cameras by operating on sets of views of pairs of cameras; and
   an integrator module configured to create an integrated depth map of the scene.

10. A telepresence apparatus as recited in claim 9, wherein the disparity creator module is configured to compare views from a selected pair of closely spaced cameras using a search, the search limited based by the known geometry, and uses dynamic programming to form a disparity map for the pair of cameras representing the depth of objects and/or participants in the scene in the camera views from the cameras.

11. A telepresence apparatus as recited in claim 10, wherein the disparity creator module is configured also to determine occlusions.

12. A telepresence apparatus as recited in claim 1, wherein synthesizer module includes a z-buffer that is filled according to the integrated depth map in order from closest to the plane of the display wall to further away.

13. A telepresence apparatus as recited in claim 1, wherein synthesizer module is configured to carry out plane sweeping, including, for each plane of any determined objects/participants in the integrated depth map, for each ray from the particular viewpoint to the object, determining which camera view(s) to use to determine the rendering of the synthesized view, including determining occlusions.

14. A telepresence apparatus as recited in claim 1, wherein the plane sweeping includes examining multiple camera views and determining agreement or disagreement amongst the camera views.

15. A method of operating a videoconference apparatus, comprising:
   accepting camera signals from a plurality of time synchronized cameras aimed at a scene;
   processing the camera signals to create video signals representing a particular view of the scene as viewed from particular point at a particular distance from the scene;
   compressing the created video signals to form a compressed video for transmission to one or more remote endpoints; and
   transmitting the compressed video to the one or more remote endpoints;
wherein the cameras are distributed substantially co-planar with and along a substantially planar display wall that is made up of one or more flat screen displays or one or more projections displays,
wherein the particular distance of the particular point is at least the width of the display wall, and wherein processing the camera signals includes scaling of parts of the scene to create the signal of the particular view, wherein objects in camera signals from a particular camera that are further away from the particular camera are enlarged relative to objects in camera signals from another camera that are close to the other camera, such that for two objects or participants that are in at least one camera view, the difference in size of the two objects or participants due to difference in their respective distance from the display wall is less in the particular view than in any single camera view in which the two objects or participants are present.

16. A method as recited in claim 15, wherein the videoconference apparatus includes an audio processor coupled to a set of one or more microphones and to at least one loudspeaker, the method further comprising:
  accepting and processing audio from the set of one or more microphones via the audio processor to form audio that is synchronized with the created video;
  compressing the processed audio for transmitting with the compressed video to form compressed audio;
  transmitting the compressed audio to the one or more remote endpoints with the transmitting of the compressed video;
  receiving a compressed remote audio signal and a synchronized remote audio signal from a first remote endpoint;
  decompressing the compressed remote video to form a decompressed remote video signal and decompressing the compressed remote audio to form a decompressed remote audio signal;
  displaying the decompressed remote video signal on the display wall;
  playing back the decompressed remote audio on the at least one loudspeaker via the audio processor.

17. A method as recited in claim 15, wherein the processing the camera signals comprises:
  creating a depth map of the scene using the camera views;
  synthesizing the particular view from the camera views according to the integrated depth map, including warping of particular camera views.

18. A method as recited in claim 17, further comprising calibrating to ascertain camera parameters of the cameras.

19. A method as recited in claim 17, wherein creating a depth map of the scene comprises:
  creating disparity maps between individual cameras by operating on sets of views of pairs of cameras; and
  integrating the created disparity maps to generate an integrated depth map of the scene.

20. A method as recited in claim 19, wherein the creating disparity maps includes comparing views from a selected pair of closely spaced, cameras including searching using a dynamic programming method, wherein the searching is limited based by a known geometry of the scene to form a disparity map for each pair of cameras representing the depth of objects and/or participants in the scene in the camera views from the cameras.

21. A method as recited in claim 19, wherein creating disparity maps includes determining occlusions.

22. A method as recited in claim 17, wherein synthesizing the particular view uses a z-buffer that is filled according to the integrated depth map in order from closest to the plane of the display wall to further away.

23. A method as recited in claim 17, wherein synthesizing the particular view includes plane sweeping, including, for each plane of any determined objects/participants in the integrated depth map, for each ray from the particular viewpoint to the object, determining which camera view(s) to use to determine the rendering of the synthesized view, including determining occlusions.

24. A method as recited in claim 17, wherein the plane sweeping includes examining multiple camera views and determining agreement or disagreement amongst the camera views.

25. A tangible computer readable storage medium in a telepresence apparatus, the tangible computer readable storage medium including instructions that when executed by one or more processors in the telepresence apparatus, the instructions being configured to operate the telepresence apparatus, the storage medium including;
  one or more portions storing code that when executed causes accepting camera signals from a plurality of time synchronized cameras aimed at a scene;
  one or more portions storing code that when executed causes processing the camera signals to create video signals representing a particular view of the scene as viewed from particular point at a particular distance from the scene; and
  one or more portions storing code that when executed causes compressing the created video signals to form a compressed video for transmission to one or more remote endpoints,
wherein the cameras are distributed substantially co-planar with and along a substantially planar display wall that is made up of one or more flat screen displays or one or more projections displays,
wherein the particular distance of the particular point is at least the width of the display wall, and
wherein processing the camera signals includes scaling of parts of the scene to create the signal of the particular view, wherein objects in camera signals from a particular camera that are further away from the particular camera are enlarged relative to objects in camera signals from another camera that are close to the other camera, such that for two objects or participants that are in at least one camera view, the difference in size of the two objects or participants due to difference in their respective distance from the display wall is less in the particular view than in any single camera view in which the two objects or participants are present.

* * * * *